E. R. POST.
NUT LOCK.
APPLICATION FILED SEPT. 19, 1916.
1,235,594.
Patented Aug. 7, 1917.
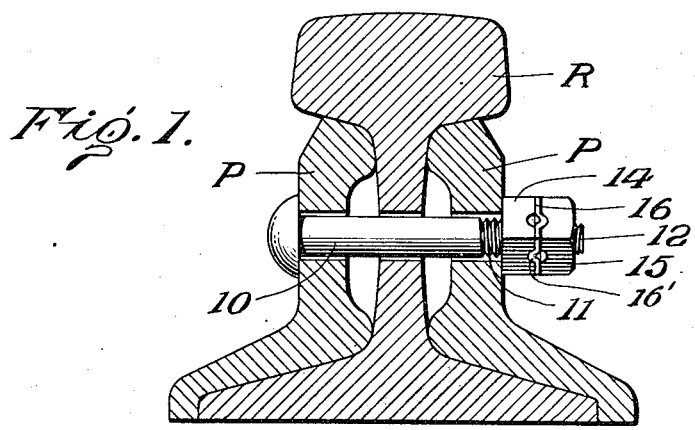
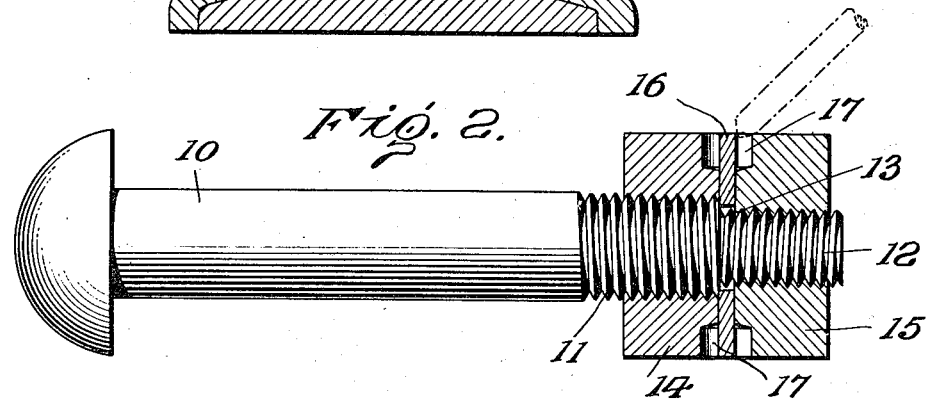
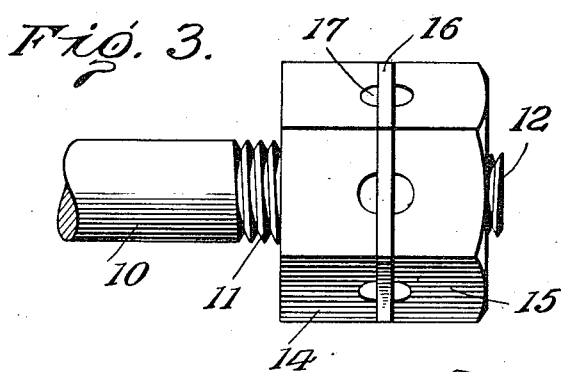
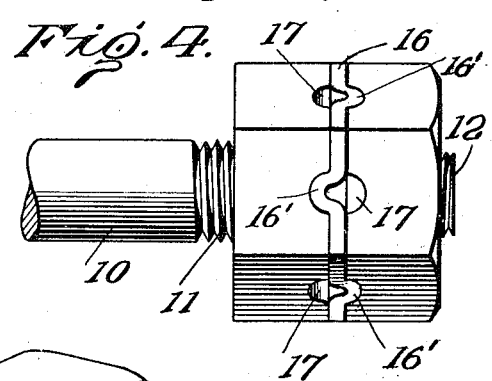
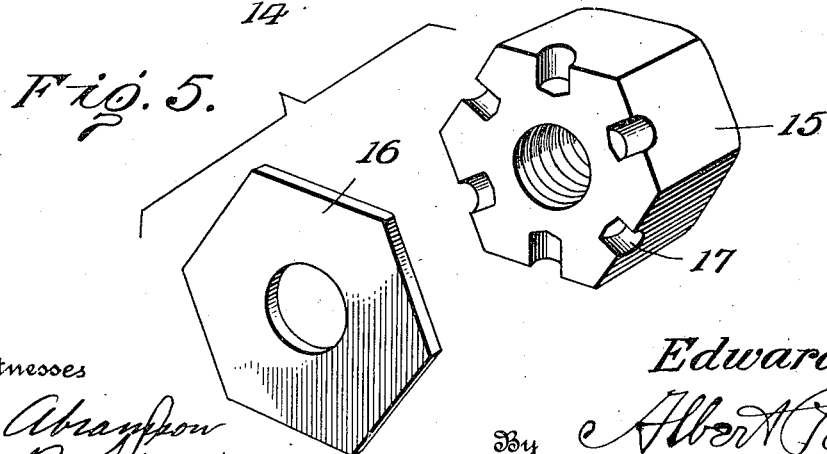
Witnesses
N. Abramson
B. B. Thompson
Inventor
Edward R. Post
By Albert Popkins
Attorney

UNITED STATES PATENT OFFICE.

EDWARD R. POST, OF TOLEDO, OHIO, ASSIGNOR OF ONE-FOURTH TO C. Q. MOORE, OF OTTAWA, OHIO.

NUT-LOCK.

1,235,594.     Specification of Letters Patent.     Patented Aug. 7, 1917.

Application filed September 19, 1916. Serial No. 120,975.

*To all whom it may concern:*

Be it known that I, EDWARD R. POST, a citizen of the United States, residing at Toledo, in the county of Lucas and State of Ohio, have invented certain new and useful Improvements in Nut-Locks, of which the following is a specification.

This invention relates to nut locks and especially to the type of nut lock described in my prior Patent No. 642,488 issued Jan. 30—1900.

Experience has shown that my former nut lock possessed a certain feature in the locking device which rendered the nut lock more expensive to manufacture than desirable. The principal object is, therefore, to so improve and simplify the nut lock as to render it far more economical to manufacture without sacrificing any of the advantages derived from the former construction.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a vertical transverse section through a rail and in its fish plates showing the improved lock in use.

Fig. 2 is an enlarged view of the bolt with its nuts and the locking device or washer ready for locking, the nuts and washer being in section.

Fig. 3 is a detail showing the nuts and washer in side elevation ready for locking.

Fig. 4 is a view similar to Fig. 3 with the parts locked.

Fig. 5 is a perspective view of the washer and one of the nuts detached.

In the improved form of nut lock I employ a bolt 10 provided with right hand threads 11 and a reduced end 12 having left hand threads, it being obvious that the direction or hand of these threads may be transposed. By reason of the reduced end 12 there is a shoulder 13 formed on the bolt at the junction of the end and body of such bolt.

On the threaded portion 11 is screwed a nut 14 and on the reduced end 12 is screwed a nut 15, a bendable washer 16 of mild soft steel or the like being interposed between the nuts and resting against the shoulder 13.

These nuts are of like contour and have their confronting faces provided with peripheral recesses 17 into which portions of the edge of the washer 16 may be bent.

In applying the device, as for instance to a rail R and fish plates F, the bolt is passed through suitable openings in said rail and fish plates so that its threaded end protrudes. The nut 14 is then screwed into place and the washer 16 applied. Next the nut 15 is screwed on until the washer is clamped between the two nuts, the recesses 17 in the nuts being preferably brought into opposition. Finally, a blunt punch or other suitable tool is placed against the inner face of the washer opposite one of the notches in the outer nut and struck with a hammer so that a portion of the washer 16' is driven into one of the recesses 17 of the outer nut 15 and then other portions of the washer are driven into adjacent recesses in the nut 14 in a similar manner.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

In combination, a bolt provided with a reduced end portion and having right and left hand threads, a shoulder formed at the base of the reduced end portion, an outer and inner nut engaging the threads of the bolt, and having corresponding recesses in their adjacent faces to form openings, a washer interposed between the nuts and engaging the shoulder, said outer nut engaging the washer and forcing the same against said shoulder, and said washer having portions engaging alternate portions of the openings of the nuts, to lock said nuts against movement.

In testimony whereof I affix my signature in presence of two witnesses.

EDWARD R. POST.

Witnesses:
 Ed E. Purnia,
 Ivan M. Moore.